US010007774B2

(12) United States Patent
Hama et al.

(10) Patent No.: US 10,007,774 B2
(45) Date of Patent: Jun. 26, 2018

(54) BIOMETRIC DATA DETECTION DEVICE

(71) Applicant: FUJITSU LIMITED, Kawasaki-shi, Kanagawa (JP)

(72) Inventors: Soichi Hama, Atsugi (JP); Takashi Morihara, Yokohama (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 14/685,961

(22) Filed: Apr. 14, 2015

(65) Prior Publication Data

US 2015/0332035 A1  Nov. 19, 2015

(30) Foreign Application Priority Data

May 13, 2014 (JP) ................... 2014-100039

(51) Int. Cl.
*H05K 1/00* (2006.01)
*G06F 21/34* (2013.01)
(Continued)

(52) U.S. Cl.
CPC ............... *G06F 21/34* (2013.01); *G06F 21/32* (2013.01); *G06K 9/00013* (2013.01); *G06K 9/00033* (2013.01); *G06K 9/00087* (2013.01); *G06K 19/0718* (2013.01); *G06K 19/07354* (2013.01); *G06K 19/07732* (2013.01)

(58) Field of Classification Search
CPC ........ H01L 23/10; H05K 5/00; H05K 5/0004; H05K 5/02; H05K 7/1461; H02G 3/08; H02G 3/00; B60R 16/0239; G06F 21/34; G06F 21/32; G06K 9/00033; G06K 9/00087; G06K 9/00013; G06K 19/0718; G06K 19/07354; G06K 19/07732
See application file for complete search history.

(56) References Cited

U.S. PATENT DOCUMENTS 6,234,389 B1 * 5/2001 Valliani ................. G06Q 20/20
                                                235/379
6,357,663 B1    3/2002 Takahashi et al.
(Continued)

FOREIGN PATENT DOCUMENTS

CN     201004323 Y    1/2008
JP     2000-48177     2/2000
(Continued)

OTHER PUBLICATIONS

EESR—Extended European Search Report of European Patent Application No. 15163838.4 dated Sep. 17, 2015.
(Continued)

*Primary Examiner* — Pete Lee
(74) *Attorney, Agent, or Firm* — Fujitsu Patent Center

(57) ABSTRACT

A biometric data detection device includes a biometric authentication sensor electrically connected to a data processing terminal through a connecting member, a housing that houses the biometric authentication sensor, a window portion that acquires biometric data to be authenticated by the biometric authentication sensor and that is formed in the housing, and an attachment member that is rotatably provided at the housing and that renders the housing rotatable in a state in which the housing is attached to the data processing terminal.

13 Claims, 12 Drawing Sheets

(51) Int. Cl.
   *G06K 9/00*    (2006.01)
   *G06F 21/32*    (2013.01)
   *G06K 19/07*    (2006.01)
   *G06K 19/073*    (2006.01)
   *G06K 19/077*    (2006.01)

(56) References Cited

U.S. PATENT DOCUMENTS

| | | | | |
|---|---|---|---|---|
| 6,490,163 | B1 * | 12/2002 | Pua | H05K 5/0278 174/250 |
| 6,676,420 | B1 * | 1/2004 | Liu | H01R 35/04 439/131 |
| 7,009,847 | B1 * | 3/2006 | Wu | H01R 13/60 174/50.52 |
| 7,025,275 | B2 * | 4/2006 | Huang | G06K 19/07732 235/486 |
| D559,249 | S * | 1/2008 | Takei | D14/480.6 |
| 8,333,615 | B2 * | 12/2012 | Zhao | H05K 5/0278 439/660 |
| 2005/0161513 | A1 | 7/2005 | Huang et al. | |
| 2006/0078176 | A1 | 4/2006 | Abiko et al. | |
| 2006/0219776 | A1 * | 10/2006 | Finn | B60R 25/25 235/380 |
| 2008/0225020 | A1 | 9/2008 | Takizawa | |
| 2011/0074710 | A1 * | 3/2011 | Weeldreyer | G06F 3/0481 345/173 |
| 2011/0104954 | A1 | 5/2011 | Zhao et al. | |

FOREIGN PATENT DOCUMENTS

| | | |
|---|---|---|
| JP | 2000-148963 | 5/2000 |
| JP | 2000-293688 | 10/2000 |
| JP | 2006-107366 | 4/2006 |
| JP | 2008-233985 | 10/2008 |
| JP | 2013-510271 | 3/2013 |
| WO | 2004/066132 A1 | 8/2004 |

OTHER PUBLICATIONS

CNOA—Office Action of Chinese Patent Application No. 201510212417.9, dated Oct. 10, 2017, with English translation of the Office Action.

JPOA—Office Action of Japanese Patent Application No. 2014-100039 dated Jan. 9, 2018, with full machine translation of the Office Action.

\* cited by examiner

BIOMETRIC DATA DETECTION DEVICE

CROSS-REFERENCE TO RELATED APPLICATION

This application is based upon and claims the benefit of priority of the prior Japanese Patent Application No. 2014-100039, filed on May, 13, 2014, the entire contents of which are incorporated herein by reference.

FIELD

The embodiments discussed herein are related to a biometric data detection device.

BACKGROUND

Biometric data such as data from fingerprints, or veins, are sometimes employed as a means of increasing security of data processing terminals. With an increasing range of services being realized using data processing terminals, it is increasingly important, for example, to restrict access to data processing terminals and use of functions of data processing terminals to valid users.

A personal computer (PC) card that includes a fingerprint verification function provided with an imaging window that images a fingerprint, a finger sensor, and the like, is an example of an authentication device employing biometric data. Inserting the PC card including the fingerprint verification function into a wide card insert slot provided on a side face of a computer enables determination of whether or not a user is valid by verification against a registered fingerprint, and enables usage of the computer to be restricted.

However, the card insert slot is sometimes provided on a left side face, and sometimes provided on a right side face, depending on the computer. There is therefore technology in which a fingerprint verification section is removable from the PC card, and the direction for attaching the fingerprint verification section to the card can be inverted according to whether the card insert slot is on the left or the right.

RELATED PATENT DOCUMENTS

Japanese Laid-Open Patent Publication No. 2000-148963

SUMMARY

According to an aspect of the embodiments, a biometric data detection device includes a biometric authentication sensor electrically connected to a data processing terminal through a connecting member, a housing that houses the biometric authentication sensor, a window portion that acquires biometric data to be authenticated by the biometric authentication sensor and that is formed in the housing, and an attachment member that is rotatably provided at the housing, and that renders the housing rotatable in a state in which the housing is attached to the data processing terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
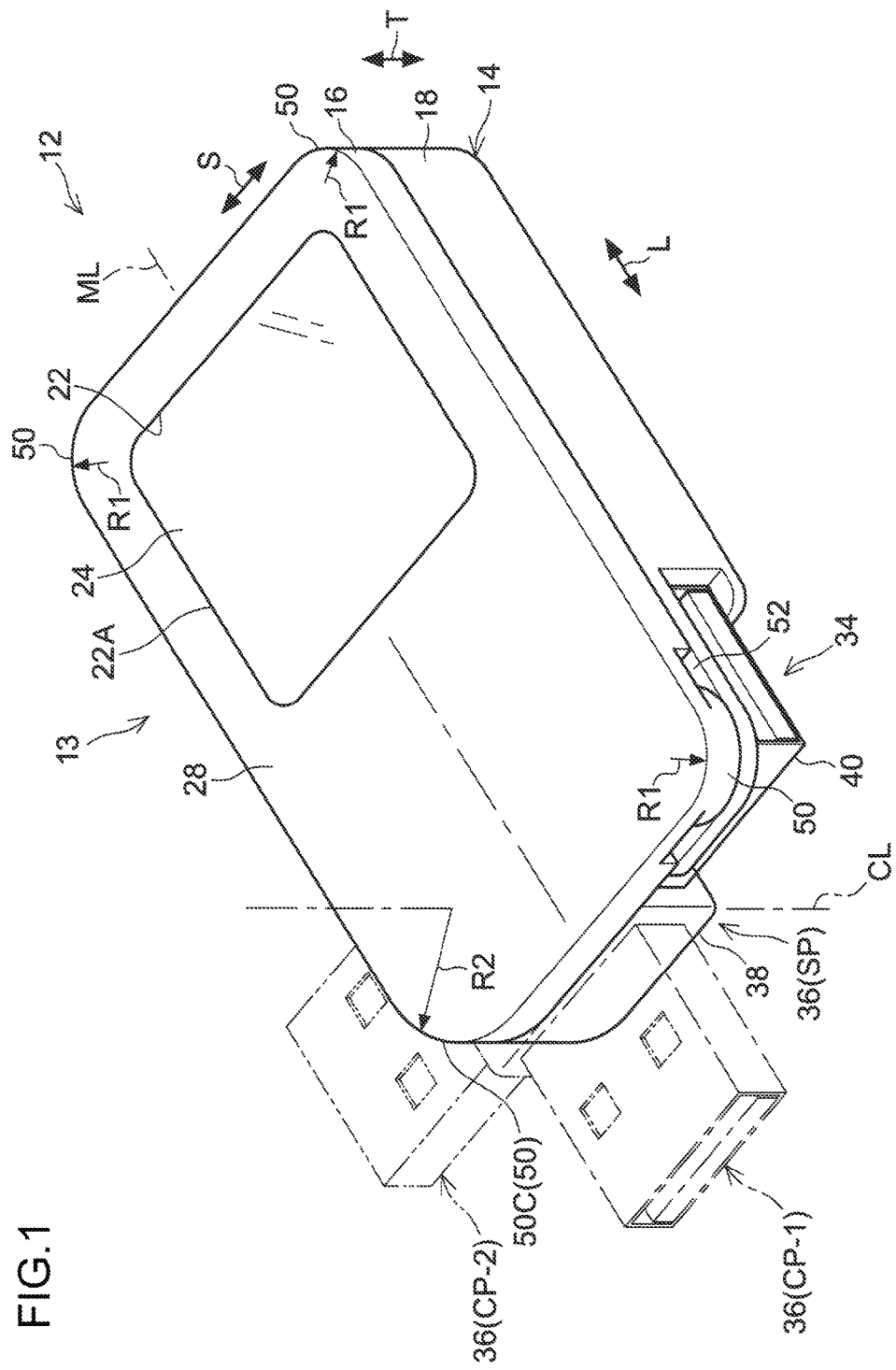
FIG. 1 is a perspective view illustrating a biometric data detection device of a first exemplary embodiment.

Detailed explanation follows regarding a first exemplary embodiment based on the drawings.

A biometric data detection device 12 of the first exemplary embodiment includes a biometric authentication unit 13. The biometric authentication unit 13 includes a housing 14. In the example illustrated in FIG. 1 to FIG. 3, the housing 14 is a substantially rectangular box shaped member. The length direction, the width direction, and the thickness direction of the housing 14 are indicated in the drawings by the arrows L, S, and T respectively. These directions are directions given for convenience of explanation, and the directions the biometric data detection device 12 is used in are not limited in practice.

Figure 4:
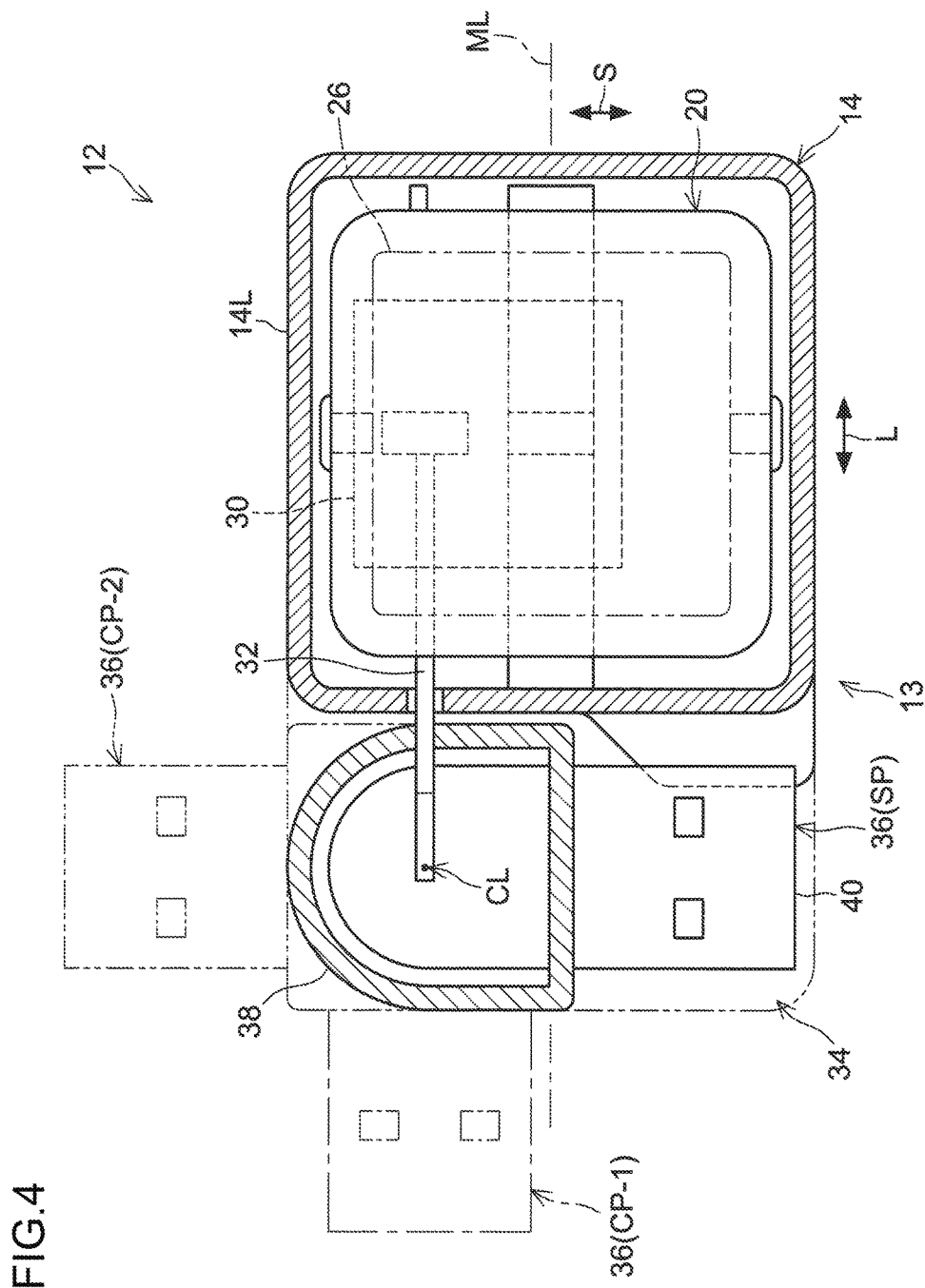
FIG. 4 is a horizontal cross-section illustrating a biometric data detection device of the first exemplary embodiment.
Figure 5:
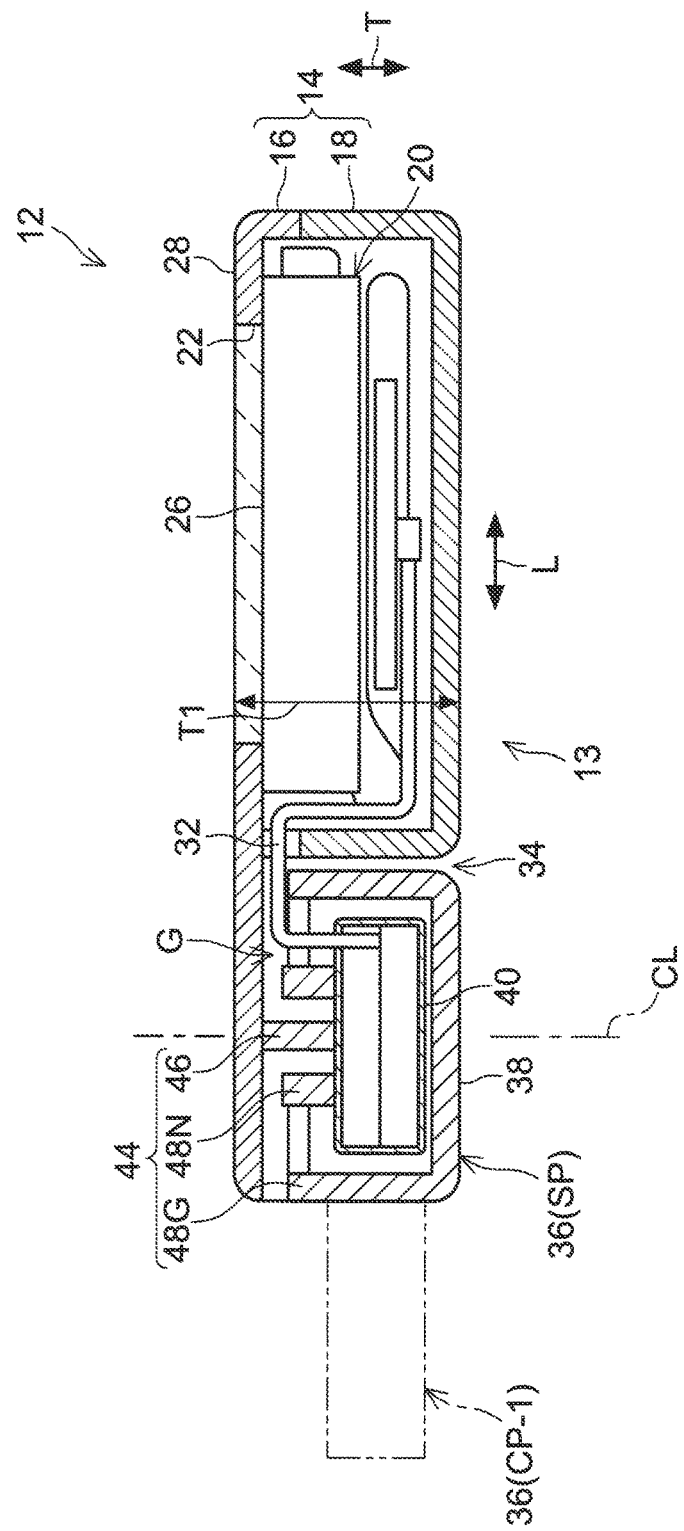
FIG. 5 is a vertical cross-section illustrating a biometric data detection device of the first exemplary embodiment.

The housing 14 includes a front member 16 and a rear member 18. A sensor placement space is formed inside the housing 14 by contacting and joining the front member 16 and the rear member 18 together at their peripheries. As illustrated in FIG. 4 and FIG. 5, the sensor placement space houses a biometric authentication sensor 20.

A light transmitting window 22 is formed on the front member 16. The light transmitting window 22 is covered by a cover plate 24 that transmits light. Light transmitted through the light transmitting window 22 (the cover plate 24) is incident to an optical receiver 26 of the biometric authentication sensor 20 (see FIG. 4 and FIG. 5).

The face of the front member 16 on which the light transmitting window 22 is formed is a windowed face 28. The biometric authentication sensor 20 includes an extraction section. In a state in which there is a portion of a biological body against the windowed face 28, the extraction section extracts biometric data from a biological body image of light received by the optical receiver 26. The biometric authentication sensor 20 is electrically connected to a relay substrate 42, described later, through a connecting substrate 30 and a connecting cable 32.

Although the light transmitting window 22 is illustrated with a planar shape (a substantially square shape, or a substantially rectangular shape) in the example illustrated in FIG. 1, the light transmitting window 22 may, for example, be one or plural bar shapes (slit shapes). Employing a planar light transmitting window achieves a structure that enables, for example, the biometric authentication sensor 20 to acquire biometric data by holding a palm or the like thereon.

In such cases, light detected by the biometric authentication sensor 20 is not only visible light, but also may include, for example, infrared rays and ultraviolet rays. The biometric data detection device 12 may be structured to include the source of such light.

Employing a bar shaped light transmitting window achieves a structure enabling, for example, the biometric authentication sensor 20 to acquire biometric data by sliding a fingertip along the length direction of the light transmitting window.

A housing recess portion 34 is formed at the rear side, and at one of the length direction sides of the housing 14. Specifically, the length of the rear member 18 is formed shorter than the front member 16, thereby forming the housing recess portion 34.

An attachment member 36 is provided to the housing recess portion 34. In the first exemplary embodiment, the attachment member 36 includes a rotating body 38, and a universal serial bus (USB) plug 40. The rotating body 38 is rotatable with respect to the housing 14 about center line CL. The USB plug 40 protrudes out from the rotating body 38. The USB plug 40 is also referred to a male connector.

The rotating body 38 is rotatably attached to the housing 14 by a rotation shaft 44. The rotating body 38 is a portion of the attachment member 36, and so the attachment member 36 is rotatably attached with respect to the housing 14. Since the housing 14 is rotatable about the rotation shaft 44, the biometric authentication unit 13 is also rotatable about the rotation shaft 44.

The rotation shaft 44 includes an attachment screw 46, an inner cylinder 48N, and an outer cylinder 48G. The attachment screw 46 screw-fastens the rotating body 38 to the housing 14 (the front member 16). The inner cylinder 48N and the outer cylinder 48G are circular cylinder shaped members surrounding the attachment screw 46. The outer cylinder 48G also houses the rotating body 38. A gap G is produced between the inner cylinder 48N and the outer cylinder 48G. The connecting cable 32 passes through the gap G.

The biometric authentication sensor 20 and the USB plug 40 are electrically connected through the connecting substrate 30 and the connecting cable 32.

As illustrated in FIG. 5, the rotation center line CL direction of the rotation shaft 44 (the attachment screw 46) is a direction normal to the windowed face 28. The attachment member 36 accordingly rotates about the center line CL with respect to the housing 14 in a plane parallel to the windowed face 28.

As illustrated in FIG. 1 and FIG. 4, the center line CL is positioned on the side nearer to a long edge 14L than a center line ML at the center in the width direction of the housing 14 (the upper side in FIG. 1 and FIG. 4), as viewed along a direction normal to the windowed face 28.

The attachment member 36 may adopt a stowed position SP indicated by solid lines in FIG. 1, FIG. 2, FIG. 4, and FIG. 5. In the stowed position SP, the entire attachment member 36 is positioned within the outline of the housing 14, as viewed along a direction normal to the windowed face 28.

The attachment member 36 rotates about the center line CL. The attachment member 36 rotates from the stowed position SP, through a first attachment position CP-1 indicated by a single dotted-dashed line, to a second attachment position CP-2 indicated by a doubled-dotted dashed line. In the present exemplary embodiment, the first attachment position CP-1 is positioned rotated 90 degree from the stowed position SP. The second attachment position CP-2 is positioned rotated 180 degree from the stowed position SP.

Figure 2:
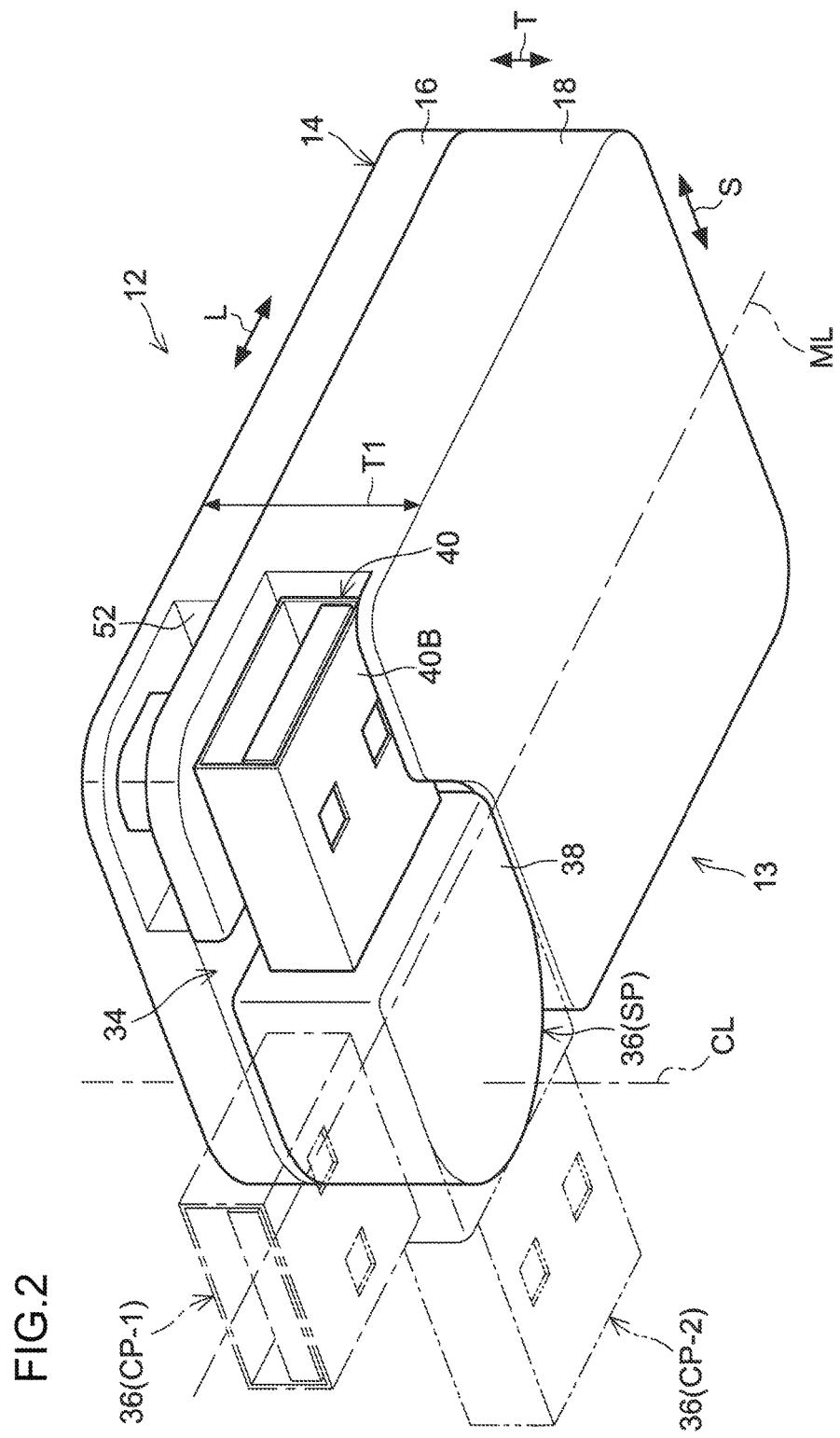
FIG. 2 is a perspective view illustrating a biometric data detection device of the first exemplary embodiment.

As illustrated in FIG. 1, FIG. 2, and FIG. 5, the attachment member 36 rotates within a range of a thickness T1 of the housing 14. In other words, the attachment member 36 does not protrude out in the thickness direction of the housing 14 when rotating from the stowed position SP to the second attachment position CP-2.

Figure 6:
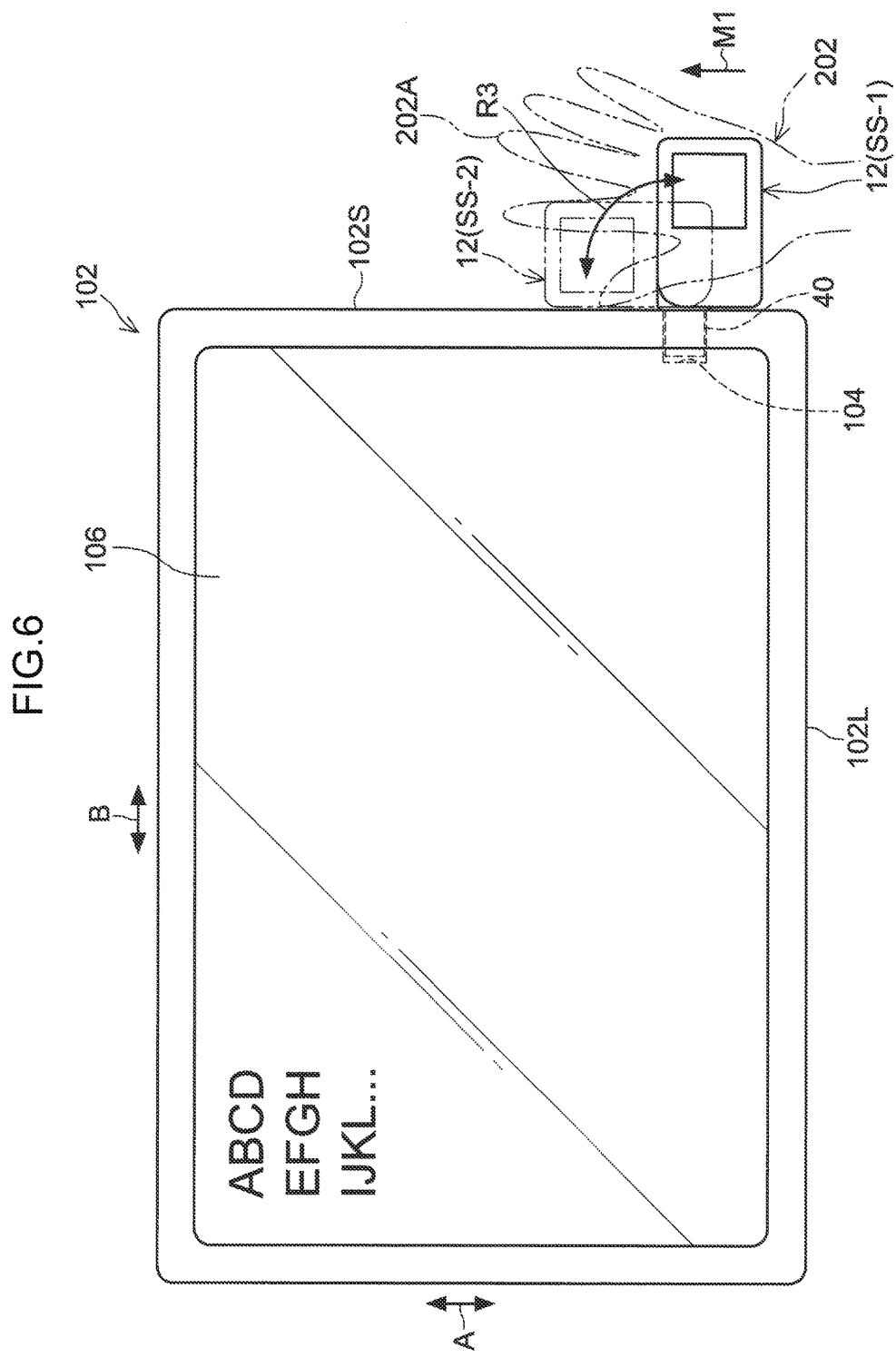
FIG. 6 is a plan view illustrating a state in which a biometric data detection device of the first exemplary embodiment is attached to a data processing terminal.

The USB plug 40 protrudes to the outside the housing 14 at the first attachment position CP-1 and the second attachment position CP-2 of the attachment member 36, as viewed along the direction normal to the windowed face 28. As illustrated in FIG. 6, the USB plug 40 protruding to the outside of the housing 14 in this manner enables the USB plug 40 to be inserted into a USB connector 104 of a tablet terminal 102 and thereby connected. The biometric data detection device 12 is thereby attached to the tablet terminal 102, and the biometric authentication sensor 20 is electrically connected to the tablet terminal 102 through the USB plug 40. The USB connector 104 is an example of an insertion port into which the USB plug 40 is inserted. A lower face 40B (or an upper face, see FIG. 2) of the USB plug 40 is an example of a specific face. The center line CL (the rotation axis) is perpendicular to the specific face. The lower face 40B (or the upper face) of the USB plug 40 is parallel to the cover plate 24 (the face of the window portion) and the windowed face 28.

The tablet terminal 102 is an example of a member to which the biometric data detection device 12 connects, namely, an example of a data processing terminal. The tablet terminal 102 may display data on a display 106. The display 106 is an example of a display section. The USB plug 40 is an example of a connecting member that connects the biometric authentication sensor 20 to the tablet terminal 102. Various members (plugs) compatible with connectors of tablet terminals may be employed as the connecting member.

In the present exemplary embodiment the attachment member 36 rotates with respect to the housing 14 about the center line CL. As indicated by the solid line and the double-dotted dashed line in FIG. 6, the housing 14 can thereby be rotated in a state in which the USB plug 40 has been inserted into the USB connector 104. The first attachment position CP-1 and the second attachment position CP-2 of the attachment member 36 are both therefore examples of attachment positions with respect to the tablet terminal 102. Positions between the first attachment position CP-1 and the second attachment position CP-2 are also attachment positions at which the USB plug 40 may be inserted into the USB connector 104 and thereby connected.

In an attached state to the tablet terminal 102, the housing 14 of the biometric data detection device 12 thus rotates with respect to the tablet terminal 102 between an orientation (a first orientation SS-1) indicated by the solid line, and an orientation (a second orientation SS-2) indicated by the double-dotted dashed line in FIG. 6. The orientation of the windowed face 28 (the light transmitting window 22) is also rotated by this rotation. In the second orientation SS-2, a window edge 22A of the light transmitting window 22 faces the tablet terminal 102 side.

In the present exemplary embodiment the biometric authentication sensor 20 and the tablet terminal 102 are electrically connected together, and the housing 14 is attached to the tablet terminal 102, by the USB plug 40. Namely, a structure in which the USB plug 40 is rotatably attached to the housing 14 serves as the attachment member 36. As illustrated in FIG. 6, for example, in the second orientation SS-2, by rotating the housing 14 (the biometric authentication unit 13) it is possible to position the window edge 22A at the side for acquiring biometric data of the fingertip 202A side of a palm 202 during authentication of the palm 202. The rotation direction of the housing 14 may also be set to a rotated direction in which the window edge 22A is not positioned at the side for acquiring biometric data from the fingertip 202A side of the palm 202.

The biometric data detection device 12 can be easily removed from the tablet terminal 102 by pulling out the USB plug 40 from the USB connector 104 (the electrical connection is also eliminated).

As illustrated in FIG. 1, one out of four corner portions 50 as viewed along a direction normal to the housing 14 is a non-contact portion 50C. The non-contact portion 50C is a shorter distance from the center line CL (has a shorter radius of curvature R2) than edges at either side of the non-contact portion 50C. The radius of curvature R2 of the non-contact portion 50C is longer than a radius of curvature R1 of the other three corner portions. As illustrated in FIG. 6, the position and shape of the non-contact portion 50C is a position that approaches the tablet terminal 102 when the biometric data detection device 12 is rotated between the first orientation SS-1 and the second orientation SS-2. However, due to the non-contact portion 50C being formed, the housing 14 does not make contact with the tablet terminal 102 during rotation, even when rotating between the first orientation SS-1 and the second orientation SS-2.

The specific shape of the non-contact portion 50C in the present exemplary embodiment is, for example, an arc shape (with a central angle of 90 degree) at a constant distance from the center line CL (radius of curvature R2) as illustrated in FIG. 1.

As illustrated in FIG. 1 and FIG. 2, a strap hole 52 is formed in the housing 14. Attaching a strap to the strap hole 52 enables the biometric data detection device 12 to be easily carried by gripping the strap or the like. The user prevents the biometric data detection device 12 from being dropped by keeping hold of the strap.

Explanation next follow regarding operation of the present exemplary embodiment.

As illustrated in FIG. 6, the biometric data detection device 12 and the tablet terminal 102 are electrically connected by inserting the USB plug 40 of the biometric data detection device 12 into the USB connector 104 of the tablet terminal 102. Since the USB plug 40 is provided to the attachment member 36, inserting the USB plug 40 into the USB connector 104 attaches the biometric data detection device 12 to the tablet terminal 102.

In a state in which the biometric data detection device 12 is thus attached (connected) to the tablet terminal 102, light is received from the biological body by the optical receiver 26 of the biometric authentication sensor 20 when a portion of the biological body, such as a palm or a finger, is placed over the light transmitting window 22. The biometric authentication sensor 20 then extracts biometric data from the biological body image. The extracted biometric data is sent to the tablet terminal 102 through the USB plug 40, enabling the tablet terminal 102 to authenticate and identify the user. For example, when plural tablet terminals 102 are shared by plural people, the secured (locked) state of the tablet terminal 102 can be deactivated by identifying the user via the biometric data detection device 12, and transition then made to setting states for individual users.

Figure 7:
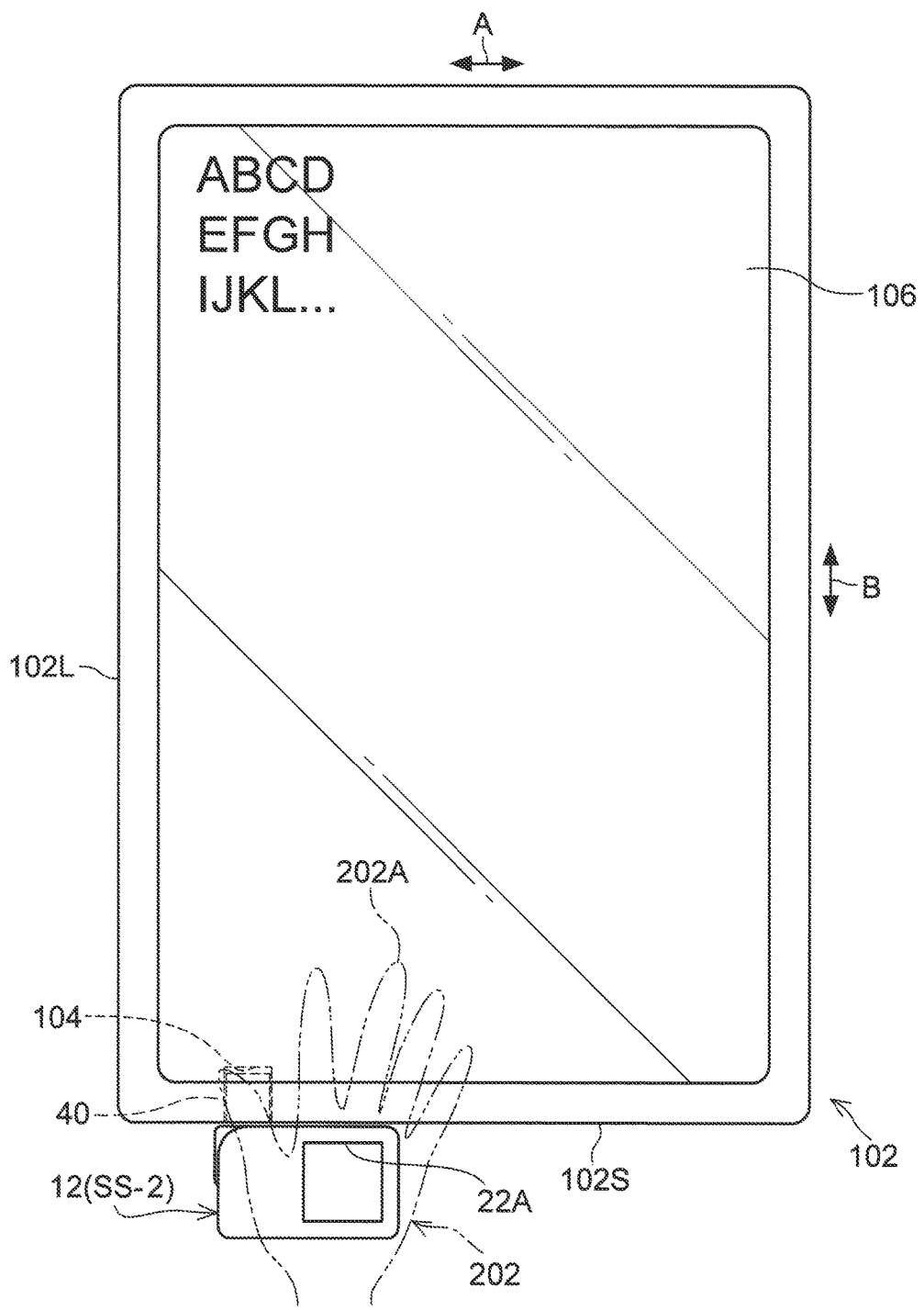
FIG. 7 is a plan view illustrating a state in which a biometric data detection device of the first exemplary embodiment is attached to a data processing terminal.

The tablet terminal 102 can be held in various ways, and usage in plural directions is conceivable. Specifically, for example, usage in a first direction that positions a short edge 102S vertically (the direction illustrated in FIG. 6), and usage in a second direction that positions a long edge 102L vertically (the direction illustrated in FIG. 7) are conceivable. The first direction and the second direction are mutually perpendicular. As illustrated in FIG. 6 and FIG. 7, the direction for displaying on the display 106 may also be switched between a first direction (the direction illustrated in FIG. 6) and a second direction (the direction illustrated in FIG. 7).

In a state in which the biometric data detection device 12 is attached to the tablet terminal 102, the orientation of the light transmitting window 22 of the biometric data detection device 12 is rotated simply by rotating the tablet terminal 102 in an arrow R3 direction.

In some cases, the orientation of the biological body with respect to the light transmitting window 22 is renewed so that stable authentication of the biological body can be achieved. In such cases, were the tablet terminal 102 and the biometric data detection device 12 to both be rotated, then the portion (palm, finger, or the like) placed over the light transmitting window 22 would also have to be rotated while authenticating the tablet terminal 102.

In contrast thereto, the attachment member 36 of the biometric data detection device 12 of the present exemplary embodiment rotates with respect to the housing 14 about the center line CL. This thereby enables the biometric data detection device 12 to maintain an attached state to the tablet terminal 102 while being rotated. Specifically, the first orientation SS-1 may be adopted in which the length direction of the housing 14 matches the length direction of the tablet terminal 102, as indicated by the solid line in FIG. 6. When the palm 202, an example of a biological body, is then placed over the light transmitting window 22, the fingertip 202A (the distal end of the biological body) side of the biological body, as indicated by the arrow M1 in FIG. 6, is positioned at the light transmitting window 22 side (the window portion side) of the biometric authentication unit 13. Accordingly, the palm 202 on the opposite side of the biological body to the side of the fingertip 202A (the non-distal end of the biological body) does not cover the display 106. Sometimes the display 106 displays, for example, authentication guidance, authentication results, or the like, however since the display 106 is not covered by a portion of the biological body, it is possible to suppress this data from becoming difficult to see.

As illustrated in FIG. 7, the biometric data detection device 12 can be rotated from the first orientation SS-1 to the second orientation SS-2 while maintaining the attached state to the tablet terminal 102. In the second orientation SS-2, the length direction of the housing 14 matches the width direction of the tablet terminal 102. The orientation of the windowed face 28 can be thus modified to an orientation appropriate to biometric data acquisition. In this state also, when the palm 202, an example of the biological body, is placed over the light transmitting window 22, the fingertip 202A side (the distal end of the biological body) of the biological body is positioned at the light transmitting window 22 side (the window portion side) of the biometric authentication unit 13. The palm 202, on the side opposite of the biological body to the side of the fingertip 202A (the non-distal end of the biological body), does not cover the display 106. Sometimes the display 106 displays, for example, authentication guidance, authentication results, or the like, and since the display 106 is not covered by a portion of the biological body, it is possible to suppress this data from becoming difficult to see.

In other words, for the site of the biological body (the palm 202) to be scanned by the biometric authentication sensor 20, the direction B1 from the fingertip 202A (distal end) toward the non-distal end is variable to either the first direction or the second direction described above by rotating the biometric authentication unit 13.

This thereby enables the orientation of the biometric data detection device 12 with respect to the user (biological body) to be maintained even when the orientation of the tablet terminal 102 is rotated with respect to the user. There is no need, therefore, to change the direction of the portion of the biological body (palm, finger, or the like) or to switch grip on the tablet terminal 102 when placing a portion of a biological body over the light transmitting window 22.

In particular, as illustrated in FIG. 1, in the present exemplary embodiment, one out of the four corner portions 50 as viewed along a direction normal to the housing 14 is the non-contact portion 50C. Thus when rotating the biometric data detection device 12, the biometric data detection device 12 can be rotated smoothly without contact or interference that would hinder rotation between the housing 14 and the tablet terminal 102.

The connected state between the biometric data detection device 12 and the tablet terminal 102 is maintained even in a freely selected position between the first attachment position CP-1 and the second attachment position CP-2. For example, the connected state is maintained even when the biometric data detection device 12 is angled with respect to the tablet terminal 102, between the first orientation SS-1 and the second orientation SS-2.

In the first exemplary embodiment, the USB plug 40 is a member that electrically connects the biometric authentication sensor 20 of the biometric data detection device 12 to the tablet terminal 102, namely, an example of a connecting member. The USB plug 40 is provided to the rotating body 38 of the attachment member 36, and the connecting member is rotatably provided to the housing as the attachment member 36. The USB plug 40 (the connecting member) therefore has less parts than in a structure in which the USB plug 40 is a separate body to the attachment member 36.

In a structure in which the USB plug 40 is a separate body from the attachment member 36, it is conceivable that a cable that connects the USB plug 40 and the biometric authentication sensor 20 would be exposed outside the housing 14. In the first exemplary embodiment, the exposed portion of the connecting cable 32 that connects to the outside of the housing 14 can be made smaller, making handling easier and giving excellent durability of the cable.

The first exemplary embodiment includes the rotation shaft 44. Thus in contrast to structures having no rotation shaft 44 (for example, a structure that guides rotation using an arc shaped groove and a ridge), more stable rotation maintaining the center line CL for rotation can be realized since the attachment member 36 is rotatably attached to the housing 14 by the rotation shaft 44.

Figure 3:
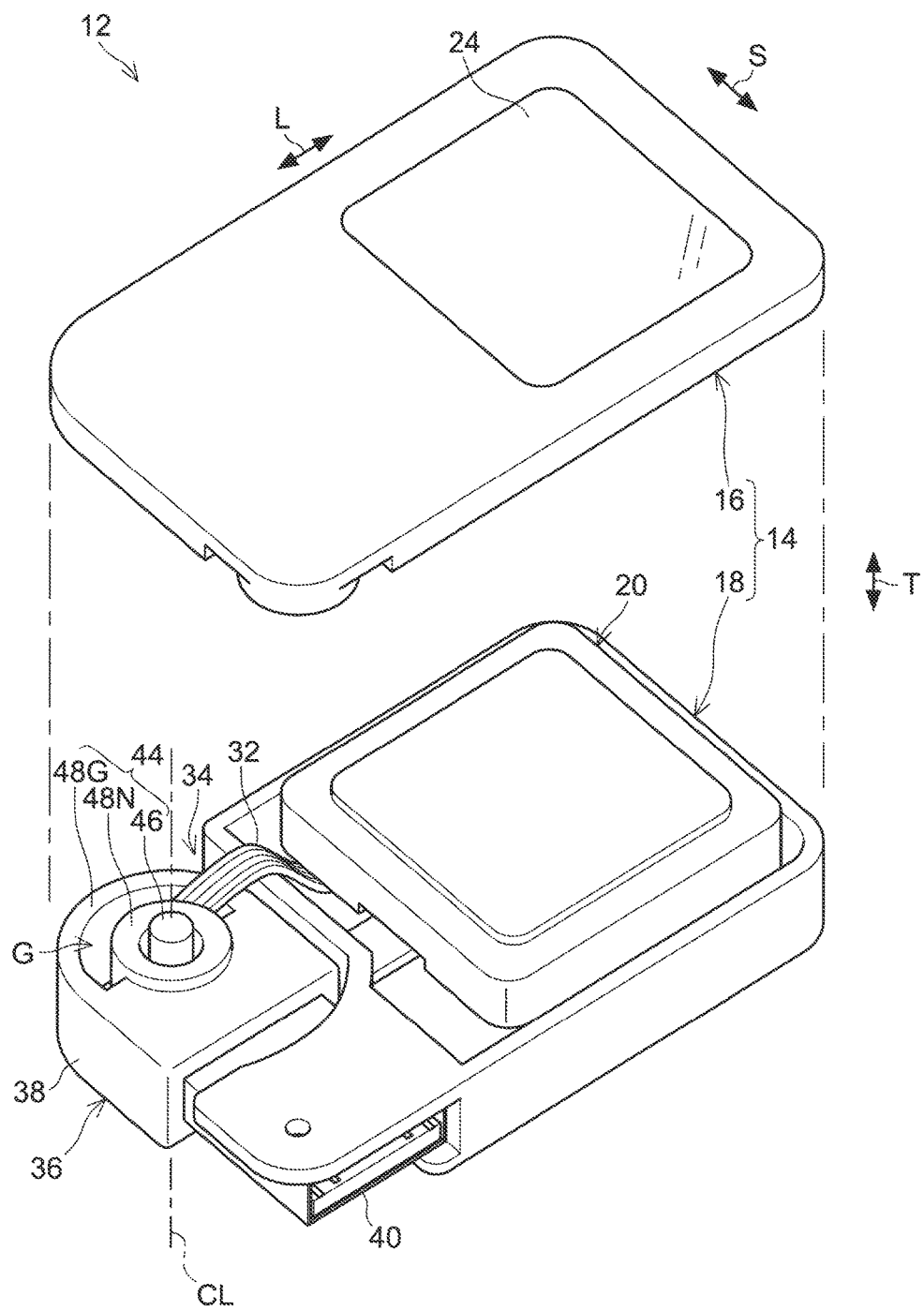
FIG. 3 is an exploded perspective view illustrating a biometric data detection device of the first exemplary embodiment.

In particular, as illustrated in FIG. 3 and FIG. 5, the first exemplary embodiment has a structure in which the connecting cable 32 passes through the interior of the rotation shaft 44. Accordingly, in contrast to structures in which the connecting cable 32 passes outside of the rotation shaft 44, the exposed portion of the connecting cable 32 that connects to the outside of the housing 14 can be made smaller, making handling easier and giving excellent durability of the cable.

In the first exemplary embodiment, the housing 14 rotatably supports the rotation shaft 44 at one axial direction side thereof through the attachment screw 46. This thereby enables the structure to be simplified compared to a structure in which a rotation shaft 44 is supported at both axial direction sides.

Figure 8:
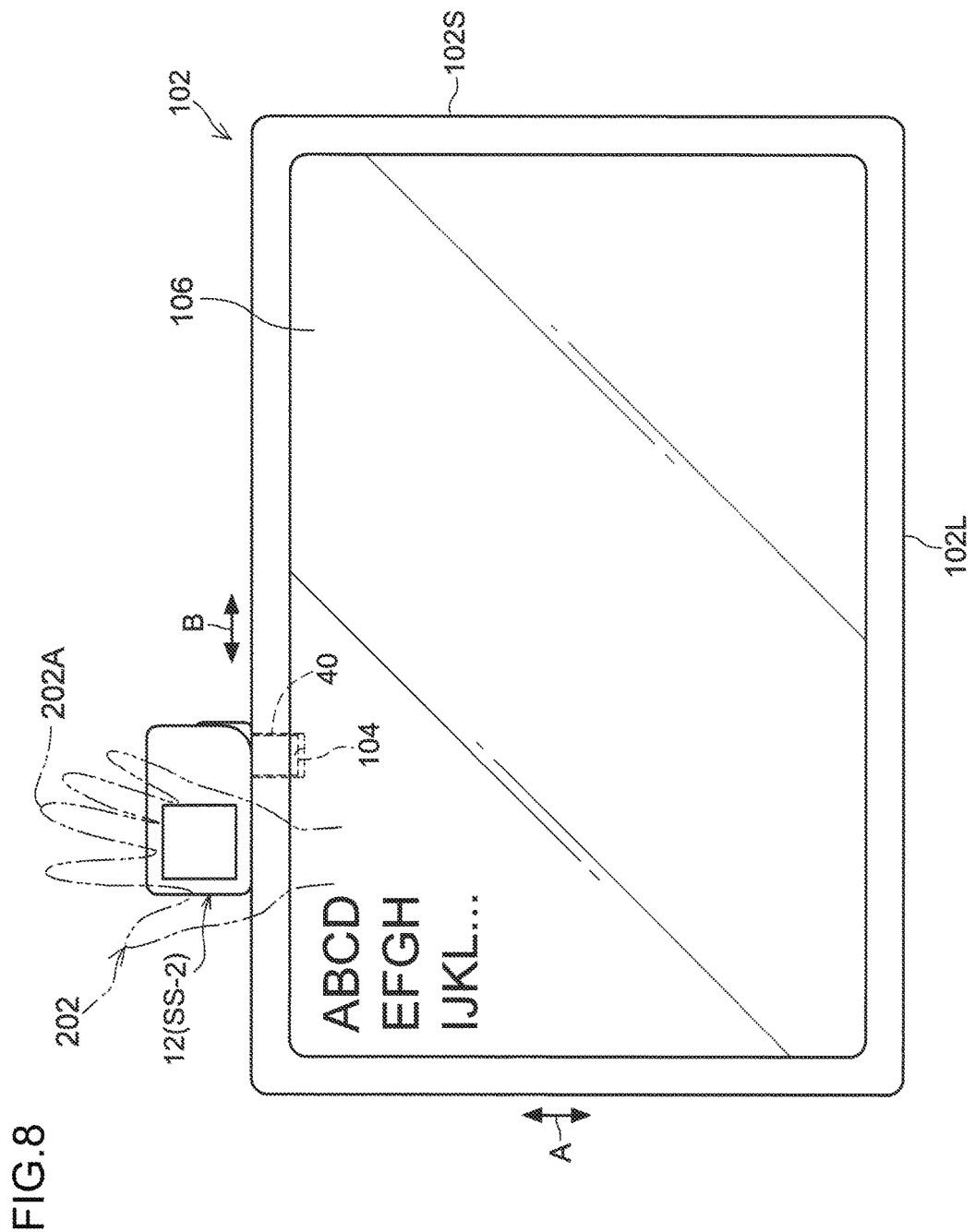
FIG. 8 is a plan view illustrating a state in which a biometric data detection device of the first exemplary embodiment is attached to a data processing terminal.
Figure 9:
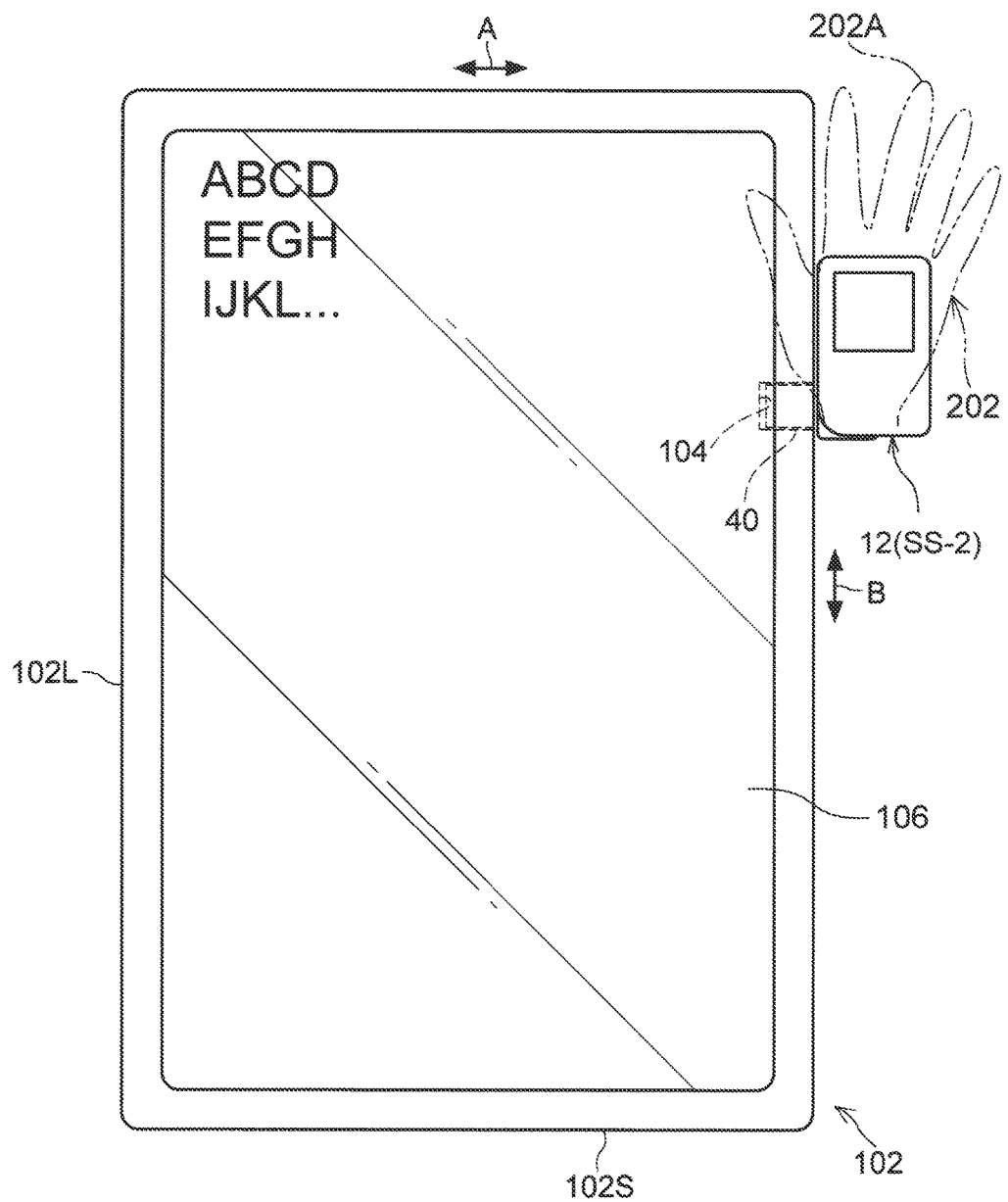
FIG. 9 is a plan view illustrating a state in which a biometric data detection device of the first exemplary embodiment is attached to a data processing terminal.
Figure 10:
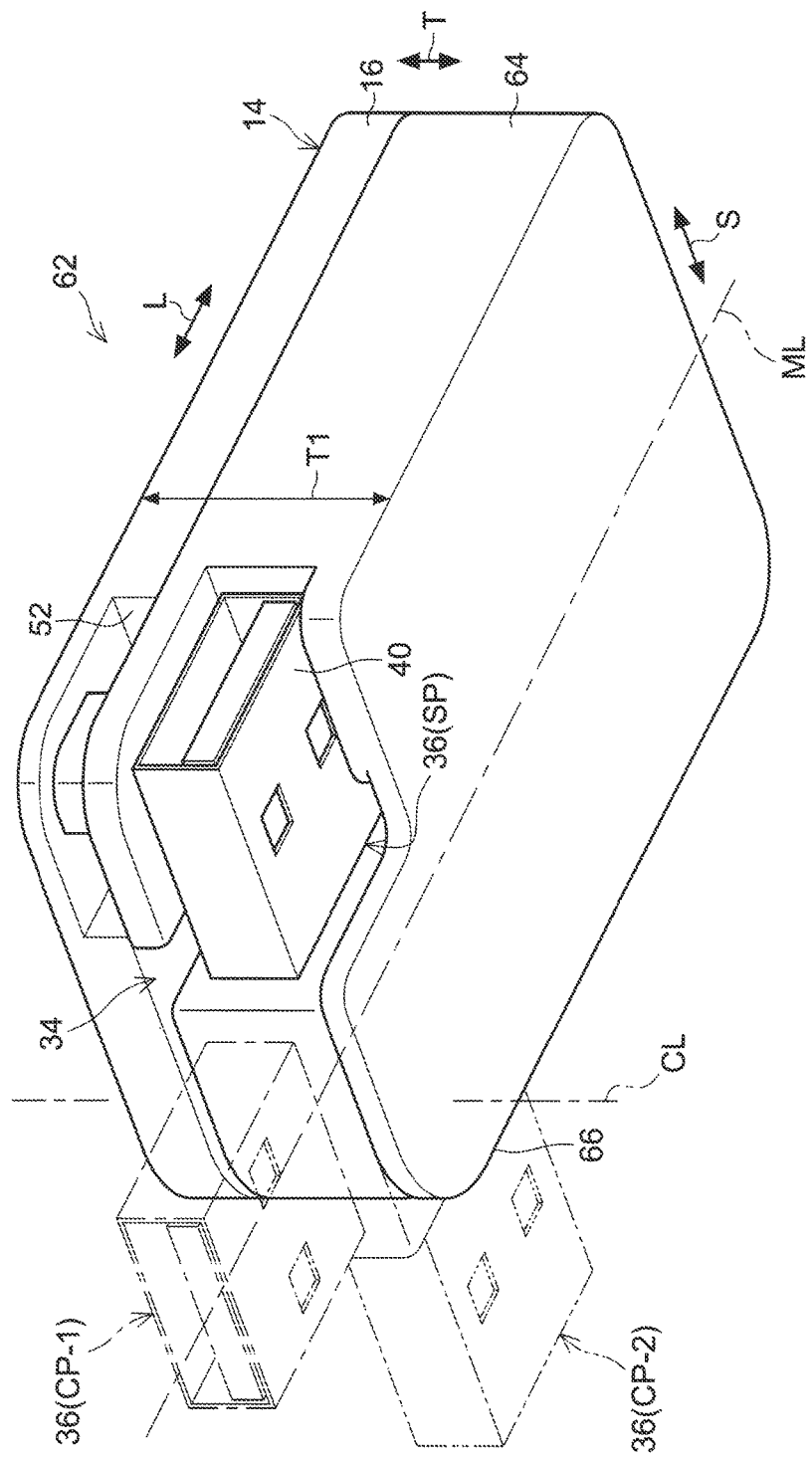
FIG. 10 is a perspective view illustrating a biometric data detection device of a second exemplary embodiment.

As illustrated in FIG. 8 and FIG. 9, the USB connector 104 may be provided to a long edge 102L of the tablet terminal 102. In the example illustrated in FIG. 8, the usage state is one in which the arrow A direction is the vertical direction and the USB connector 104 is positioned at the upper side. In the example illustrated in FIG. 9, the usage state in one in which the arrow B direction is the vertical direction and the USB connector 104 is positioned at a lateral side.

As illustrated in FIG. 6, in the first exemplary embodiment, a portion of an edge of the tablet terminal 102 is sometimes covered by the housing 14 when the biometric data detection device 12 is attached to the tablet terminal 102. The portion covered by the housing 14 sometimes includes a functional component of the tablet terminal 102 (such as a connection terminal or a type of switch). The functional component can be exposed to achieve a usable state by appropriately rotating the biometric data detection device 12.

Explanation next follows regarding a second exemplary embodiment. In the second exemplary embodiment, elements, members, and the like that are similar to those of the first exemplary embodiment are appended with the same reference numerals in the drawings as the first exemplary embodiment, and detailed explanation thereof is omitted.

A rear member 64 in a biometric data detection device 62 of the second exemplary embodiment includes a projecting section 66. The projecting section 66 projects out toward the rear side of a rotating body 38 of an attachment member 36. The projecting section 66 covers the rotating body 38 from the rear side. A rotation shaft 44 is supported at both sides by two members, these being a front member 16 and the projecting section 66.

In the biometric data detection device 62 of the second exemplary embodiment, the rotation shaft 44 (see FIG. 3 and FIG. 5) is thereby supported at both sides. In other words, the attachment member 36 is supported by being gripped from both thickness direction sides. Attachment strength and rotation strength of the attachment member 36 with respect to the housing 14 is thereby enhanced.

Explanation next follows regarding a third exemplary embodiment. In the third exemplary embodiment, elements, members, and the like similar to those of the first exemplary embodiment are appended with the same reference numerals in the drawings as the first exemplary embodiment, and detailed explanation thereof is omitted.

Figure 11:
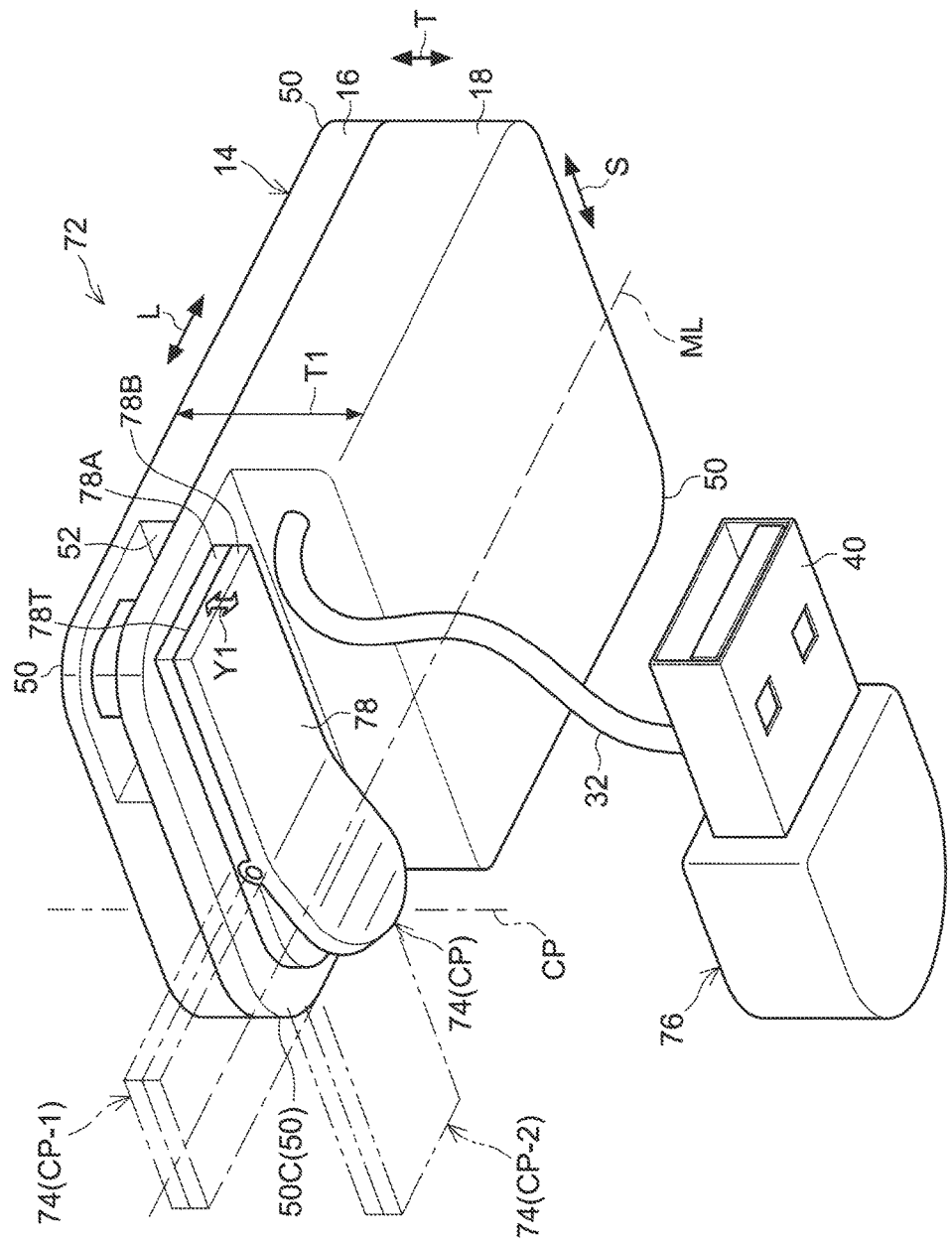
FIG. 11 is a perspective view illustrating a biometric data detection device of a third exemplary embodiment.

As illustrated in FIG. 11, in a biometric data detection device 72 of the third exemplary embodiment, an attachment member 74 and a connecting member 76 are separate bodies. The connecting member 76 includes a USB plug 40 and a connecting cable 32. The connecting cable 32 electrically connects a biometric authentication sensor 20 (see FIG. 4 and FIG. 5) and the USB plug 40.

The attachment member 74 includes a clip 78. The clip 78 includes two plate members 78A, 78B. The one plate member 78A has a flat plate shape, and is attached to a housing 14 so as to be rotatable about a center line CL. The clip 78 rotates from a stowed position SP indicated by the solid line, through a first attachment position CP-1 indicated by the single-dotted dashed line, to a second attachment position CP-2 indicated by the double-dotted dashed line in FIG. 11.

The other plate member 78B bends obtusely near the length direction center, and is attached to the one plate member 78A at the bent portion so as to be capable of swinging in the arrow Y1 direction with respect to the one plate member 78A.

The clip 78 includes a spring. The spring biases the plate member 78B toward the plate member 78A so as to close a tip 78T side of the clip 78 (such that the plate member 78B contacts the plate member 78A). The plate member 78B can be separated from the plate member 78A at the tip 78T side by countering the biasing force of the spring.

In the third exemplary embodiment, the biometric data detection device 72 can be clamped and attached to a tablet terminal 102 (see FIG. 6) using the attachment member 74 (the clip 78). The biometric authentication sensor 20 of the biometric data detection device 72 (see FIG. 4 and FIG. 5) can be electrically connected to the tablet terminal 102 by the USB plug 40.

The orientation of a windowed face 28 (see FIG. 1) can then be modified by rotating the biometric data detection device 12 while the biometric data detection device 72 is retained in an attached state to the tablet terminal 102.

In the first exemplary embodiment to the third exemplary embodiment, when the attachment member is in the stowed position SP, the whole of the attachment member is positioned inside the housing 14, as viewed along a direction normal to the windowed face 28. The attachment member has excellent storability and portability since the attachment member does not jut out to the outside of the housing in the stowed position SP.

In the first exemplary embodiment to the third exemplary embodiment, the attachment member rotates from the stowed position SP to arrive at the first attachment position CP-1. When in the stowed position SP, the USB plug 40 is positioned inside the housing 14, as viewed along a direction normal to the windowed face 28. The USB plug 40 can thereby be positioned so as to be connectable to the tablet terminal 102 by the simple action of rotating the attachment member from the stowed position SP.

Explanation next follows regarding a fourth exemplary embodiment. In the fourth exemplary embodiment, elements, members, and the like similar to those of the first exemplary embodiment are appended with the same reference numerals in the drawings as the first exemplary embodiment, and detailed explanation thereof is omitted.

Figure 12:
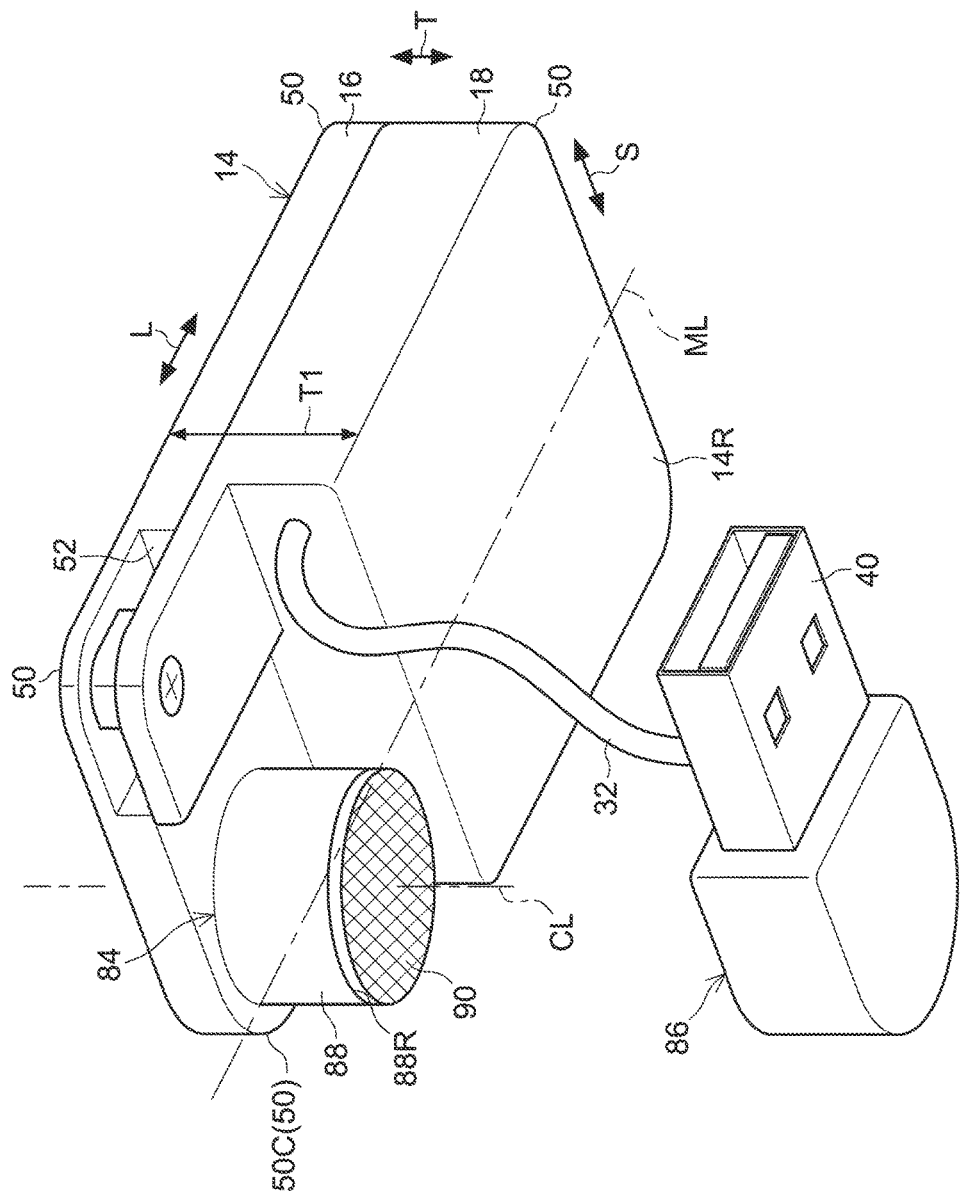
FIG. 12 is a perspective view illustrating a biometric data detection device of a fourth exemplary embodiment

As illustrated in FIG. 12, in a biometric data detection device 82 of the fourth exemplary embodiment, an attachment member 84 and a connecting member 86 are separate bodies. The connecting member 86 includes a USB plug 40 and a connecting cable 32. The connecting cable 32 electrically connects a biometric authentication sensor 20 (see FIG. 4 and FIG. 5) and the USB plug 40.

The attachment member 84 includes a rotating body 88. The rotating body 88 is attached to a housing 14 so as to be rotatable about a center line CL. A bottom face 88R of the rotating body 88 is in the same position in the thickness direction as a rear face 14R of the housing 14, or positioned further to the rear side (the arrow R direction side) than the rear face 14R.

A hook-and-loop fastener 90 is attached to the bottom face 88R of the rotating body 88. In the fourth exemplary embodiment, a hook-and-loop fastener is also attached to a tablet terminal 102 (see FIG. 6).

In the fourth exemplary embodiment, the biometric data detection device 82 can be attached to the tablet terminal 102 (see FIG. 6) using the attachment member 84. The biometric authentication sensor 20 of the biometric data detection device 82 (see FIG. 4 and FIG. 5) and the tablet terminal 102 can be electrically connected by the USB plug 40.

The orientation of a windowed face 28 can then be modified by rotating the biometric data detection device 82 while the biometric data detection device 82 is retained in an attached state to the tablet terminal 102 by the connecting member 86.

In each of the exemplary embodiments described above, in the housing 14 the center line CL is offset further to one long edge 102L side than the center line ML (see FIG. 5). As illustrated in FIG. 6, in an attached state to the short edge 102S of the tablet terminal 102, the biometric data detection device is oriented along the short edge 102S, as indicated by the double-dotted dashed line, enabling the biometric data detection device to be positioned near to the tablet terminal 102.

Consider a structure in which the USB connector 104 of the tablet terminal 102 is provided to the long edge 102L. In an attached state to the long edge 102L at the lower side of the tablet terminal 102, the biometric data detection device can be orientated along the long edge 102L, namely, the biometric data detection device can be positioned close to the tablet terminal 102.

The biometric data detection device can thereby be positioned close to the tablet terminal 102, both when attached to the long edge 102S, and when attached to the long edge 102L of the tablet terminal 102. Namely, an overall reduction in size is enabled in a state in which the biometric data detection device is attached to the tablet terminal 102.

In each of the exemplary embodiments described above, the attachment member rotates with respect to the housing 14 in a plane parallel to the windowed face 28. In a state in which the biometric data detection device is attached to the tablet terminal 102, the orientation of the windowed face 28 can accordingly be modified by movement (rotation) in a single plane parallel to the windowed face 28.

The attachment member rotates with respect to the housing 14 within the range of the thickness T1 of the housing 14. The biometric data detection device has excellent storability and portability since the attachment member does not jut out in the thickness direction from the housing 14, even when the attachment member is rotated.

The data processing terminal that connects to the biometric data detection device is not limited to the tablet terminal 102 described above, and may be a cellphone, a smartphone, or the like. Moreover, the data processing terminal may be a terminal for managing goods in factories, warehouses, shops, and the like.

Although explanation regarding exemplary embodiments of technology disclosed herein has been given above, technology disclosed herein is not limited thereto, and obviously various modifications other than those described above may be implemented within a range not departing from the spirit of the present invention.

Technology disclosed herein enables the orientation of a windowed face that acquires biometric data to be modified, while maintaining a state of attachment to a data processing terminal.

In a state in which the biometric data detection device of the above exemplary embodiments is attached to the data processing terminal, the orientation of the biometric data detection device with respect to a user can be maintained when the orientation of the data processing terminal changes. When detecting the biometric data on the biometric data detection device, changing the orientation of the biological body to match that of the biometric data detection device can be avoided, and the cumbersomeness of matching the orientation of the biological body to that of the biometric data detection device is avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

All publications, patent applications and technical standards mentioned in the present specification are incorporated by reference in the present specification to the same extent as if the individual publication, patent application, or technical standard was specifically and individually indicated to be incorporated by reference.

What is claimed is:

1. A biometric data detection device comprising:
a data processing terminal including a display portion;
a biometric authentication sensor electrically connected to the data processing terminal through an attachment member;
a housing that houses the biometric authentication sensor;
a window portion that acquires biometric data to be authenticated by the biometric authentication sensor, and that is formed in the housing, the window portion is disposed so as to be parallel to the display portion of the data processing terminal in a state in which the housing is attached to the data processing terminal;
a rotation shaft that retains the attachment member so as to be rotatable with respect to the housing, and that has an inner cylinder and an outer cylinder; and
the attachment member that is rotatably provided at the housing, a transverse direction of the attachment member, as seen from an inserting direction of the attachment member into the data processing terminal, is perpendicular to a windowed face of the housing on which the window portion is formed, and that renders the housing rotatable in the state in which the housing is attached to the data processing terminal, wherein
a connection cable connecting the attachment member and the biometric authentication sensor together passes through an interior of the rotation shaft via a gap between the inner cylinder and the outer cylinder.

2. The biometric data detection device of claim 1, wherein the attachment member rotates along a plane parallel to the windowed face.

3. The biometric data detection device of claim 2, wherein the attachment member rotates with respect to the housing within a range of a housing thickness that runs along a direction normal to the windowed face.

4. The biometric data detection device of claim 1, wherein the housing supports the rotation shaft at one axial direction side.

5. The biometric data detection device of claim 1, wherein the housing supports the rotation shaft at both axial direction sides.

6. The biometric data detection device of claim 1, wherein, by rotation, the entire attachment member adopts a stowed position in which the attachment member is positioned inside the housing, as viewed along a direction normal to a windowed face on which the window portion is formed.

7. The biometric data detection device of claim 6, wherein the attachment member arrives at an attachment position protruding from the housing, as viewed along the normal direction, by rotation of the attachment member from the stowed position.

8. The biometric data detection device of claim 1, wherein a center of rotation of the attachment member with respect to the housing is offset toward one long edge side of the housing, as viewed along a direction normal to a windowed face on which the window portion is formed.

9. The biometric data detection device of claim 1, wherein, the housing is formed with a non-contact portion that permits rotation of the housing with respect to the data processing terminal, without contacting the data processing terminal, in the state in which the housing is attached to the data processing terminal.

10. A biometric data detection device comprising:
a data processing terminal including a display portion;
an attachment member that electrically connects to the data processing terminal when inserted into an insertion port of the data processing terminal; and
a biometric authentication unit that is connected to the attachment member so as to be rotatable about a rotation axis perpendicular to a specific face of the attachment member, and that has a windowed face, on which a window portion that acquires biometric data is formed, positioned parallel to the specific face, the window portion is disposed so as to be parallel to the display portion of the data processing terminal in a state in which the biometric authentication unit is attached to the data processing terminal, and a transverse direction of the attachment member, as seen from an inserting direction of the attachment member into the data processing terminal, is perpendicular to the windowed face on which the window portion is formed, wherein
the rotation axis has an inner cylinder and an outer cylinder, and
a connection cable connecting the attachment member and the biometric authentication unit together passes through an interior of the rotation axis via a gap between the inner cylinder and the outer cylinder.

11. The biometric data detection device of claim 10, wherein, by the rotation, a side of the window portion facing the data processing terminal is positioned at a side of the biometric authentication unit that acquires biometric data at a distal end side of a biological body.

12. The biometric data detection device of claim 10, wherein, in a state of being connected to the data processing terminal, the direction of the rotation is set such that a side of the window portion facing toward the side of the data processing terminal is not positioned at a side of the biometric authentication unit for acquiring biometric data from a non-distal end side of a biological body.

13. The biometric data detection device of claim 10, wherein:
the data processing terminal is a tablet-type data processing terminal a display direction for displaying on the display portion is switchable between a first direction and a second direction perpendicular to the first direction; and
by rotating the biometric data authentication unit, a direction from a distal end side of a site of a biological body to be scanned at the window portion toward a non-distal end side of the biological body, is variable to either the first direction or the second direction.

* * * * *